United States Patent [19]

Kasiewicz

[11] 4,437,789
[45] Mar. 20, 1984

[54] METHOD AND MEANS FOR PROTECTING BURIED CABLE FROM RODENT DAMAGE

[75] Inventor: Allen B. Kasiewicz, Rumson, N.J.

[73] Assignee: GK Technologies, Incorporated, Greenwich, Conn.

[21] Appl. No.: 305,359

[22] Filed: Sep. 24, 1981

[51] Int. Cl.³ .................. E02D 29/10; F16L 1/02; F16L 57/00
[52] U.S. Cl. ................... 405/156; 405/155; 405/157; 405/174
[58] Field of Search ............... 405/155–157, 405/176, 177, 174, 180

[56] References Cited

U.S. PATENT DOCUMENTS

| 3,332,249 | 7/1967 | Idoine | 405/180 X |
| 3,546,890 | 5/1968 | Ede | 405/157 |
| 3,604,215 | 9/1971 | Dunn | 405/155 |
| 4,110,991 | 9/1978 | Torkuhl | 405/157 |
| 4,326,347 | 4/1982 | Ballinger | 405/180 X |

FOREIGN PATENT DOCUMENTS

| 130896 | 7/1947 | Australia | 405/157 |
| 969950 | 9/1964 | United Kingdom | 405/156 |
| 648700 | 2/1979 | U.S.S.R. | 405/155 |

*Primary Examiner*—David H. Corbin
*Assistant Examiner*—Nancy J. Stodola
*Attorney, Agent, or Firm*—Hopgood, Calimafde, Kalil, Blaustein & Judlowe

[57] ABSTRACT

This invention contemplates method and apparatus for laying rodent-protected cable from a moving vehicle, using unprotected cable to which sheathed cementitious material is applied prior to subterrain burial. The sheathing serves only to retain shape of fresh, unset cementitious material around the cable in the course of handling and transport within and from the vehicle structure, to the buried position of the cable. The sheathing being degradable (in the course of time) and no longer needed once the sheathed cementitious material has set, after burial.

16 Claims, 9 Drawing Figures

METHOD AND MEANS FOR PROTECTING BURIED CABLE FROM RODENT DAMAGE

BACKGROUND OF THE INVENTION

The invention relates to the burying of electrical or other cable, in a manner which assures protection against attack by gnawing or burrowing rodents.

Underground cable-laying is a well-established art that is currently implemented by tractor vehicles or tractor-drawn vehicles which drag an earth plow at desired cable-burial depth and which continuously guide cable to burial depth, via the trailing end of the plow. With such equipment, it is merely the cable itself which is buried, the same having been manufactured at a factory to the capacity of a suitable drum, via which it is stored, shipped, and mounted to the cable-laying equipment, the prefabricated cable being paid out in the course of cable-laying vehicle travel. In this situation, any rodent protection for the cable must necessarily be a part of the premanufactured cable, i.e., as paid out in the course of cable-laying, but such fabrication for protection against rodents necessarily involves added bulk, materials, transportation, handling and inventory cost.

U.S. Pat. No. 3,604,215 discloses apparatus and a technique of burying cable wherein a conductive mud, which may include Portland cement, is mixed on a plowing vehicle that is said to excavate a subsurface passage into which fresh mix is injected by a "mud jack" directly into the passage adjacent the pay-out exit of cable from the plow share, the mud or mortar discharge being under such hydraulic pressure as to force intimate contact with all metal surfaces and with confines of the excavated passage, squeezing out water and air from the soil, and compacting undisturbed soil, to thereby form an electrical grounding medium, presumably in aid of the function of the electrical grounding cable or wire implanted therewith.

The art cited in said patent is substantial and represents a century of effort directed to the burial of cable, including the use of cement in that connection. Therefore, reference is made to said cited patents for additional background information.

In spite of the indicated background of patent literature, I am unaware of any prior method or apparatus which addresses the problem of economics, i.e., inexpensive, efficient use of materials to bury a communications cable, such as a non-conductive cable containing plural optical-fiber channels so as to provide inherent continuous protection of the cable against rodent attack.

BRIEF STATEMENT OF THE INVENTION

It is an object of the invention to provide an improved method and vehicular apparatus of the character indicated, specifically applicable to protection of cable against rodent attack, once the cable has been buried.

A specific object is to meet the above object by employing hardenable sheath material in continuous limited and uniform application to the cable in the course of vehicle displacement.

The invention achieves the foregoing objects and other features by employing on the vehicle a flexible strip of sheathing material and by configuring the same as a circumferentially confining flexible envelope into which cementitious material is admitted to encase the cable in the course of pay out and while the cable is in its course of movement on the vehicle, i.e., before the cable leaves the vehicle. Once the cable and its cement-filled envelope have left the vehicle, there is opportunity for adaptation to local ground surface or ditch bottom elevation before the cement sets and hardens into a rodent-resistive casing. And of course, once the cement hardens, the envelope is no longer needed and may therefore be allowed to bio-degrade in the course of time.

DETAILED DESCRIPTION OF THE DRAWINGS

Figure 1:
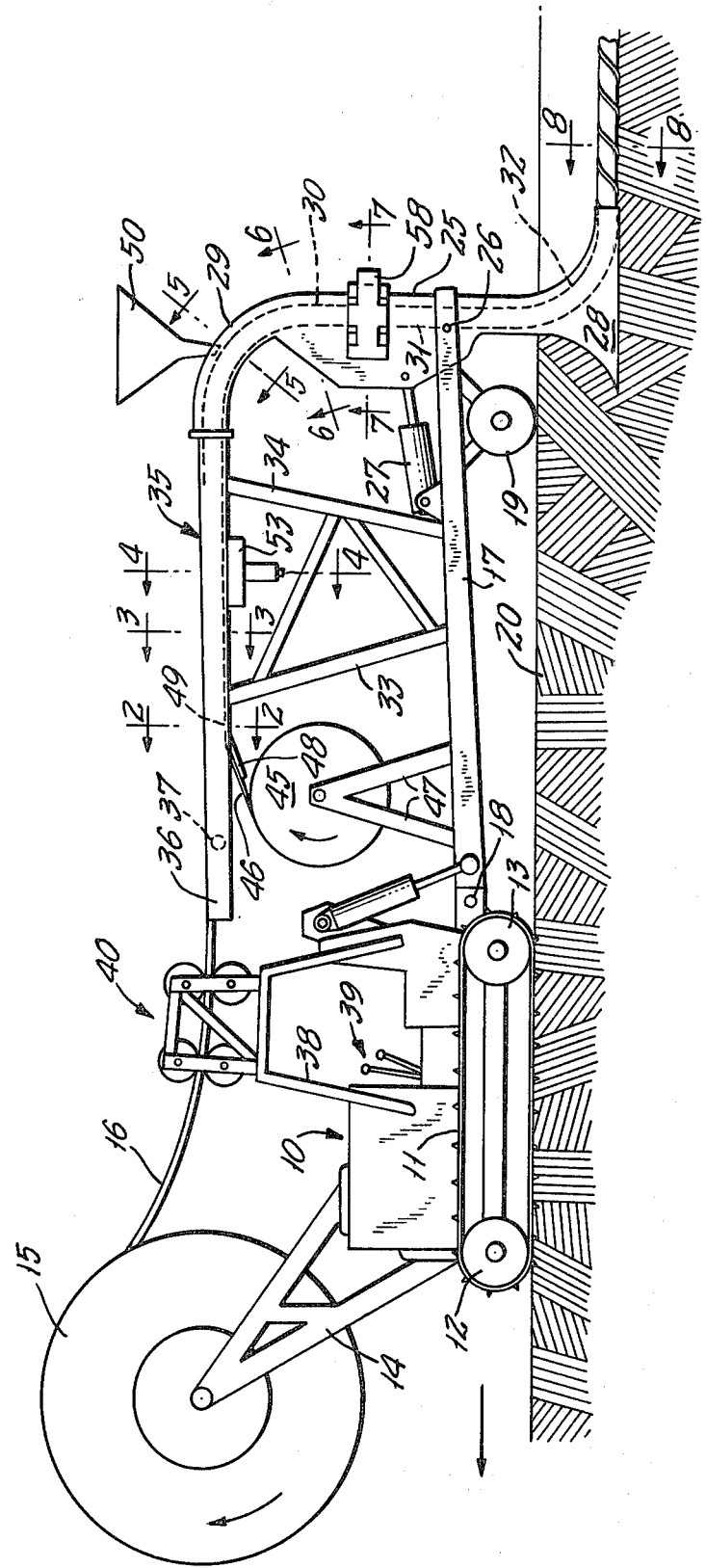
Figure 4A:
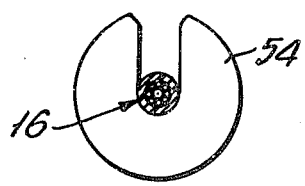
Figure 4:
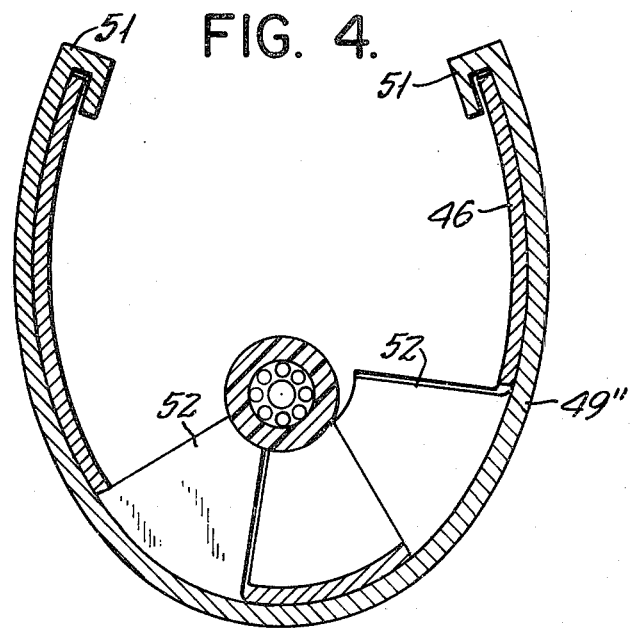

The invention will be described in detail in conjunction with the accompanying drawings, in which:

FIG. 1 is a simplified view in elevation of a self-propelled vehicle adapted for cable-laying and embodying structure of the invention for rodent-protecting cable on the vehicle and before it is laid upon or beneath the ground; and FIGS. 2 to 8 are enlarged sectional views taken at successive transverse planes 2—2, 3—3, 4—4, 5—5, 6—6, 7—7 and 8—8 in FIG. 1, FIG. 4 being a simplified showing of an alternative for use at the FIG. 4 location.

Referring initially to FIG. 1, the invention is shown in application to a tractor-type vehicle 10 having endless track treads 11 spanning front and rear sprocket-type wheels 12-13. Suitable bracket structure 14 at the front of the vehicle supports a drum 15 from which cable 16 to be rodent-protected is continuously paid out in the course of vehicle movement for cable-laying purposes. At the rear of vehicle 10, a generally horizontal boom or trailer frame 17 has articulated connection at 18 and a rear-wheel suspension 19 enables maintenance of a desired substantially uniform clearance of the rear end of frame 17 with respect to ground 20.

An upstanding frame 25 is tiltable on the horizontal axis of pivot means 26, by which it is carried at the rear of horizontal frame 17, subject to controlled orientation via hydraulic actuating means 27. At the lower end of frame 25, a plow 28 extends to a predetermined depth beneath the surface of the ground and will be understood in the course of vehicle movement to generate a ditch or cavity for the accommodation of cable 16 as it is paid out. The upper end 29 of frame 25 carries a first gentle 90-degree bend 30 of guide means for moving cable; the bend 30 communicates tangentially with a vertical portion 31 of such guide means, and a second gentle 90-degree bend 32 tangentially communicates with the vertical portion 31 for guidance of cable to its ultimate buried elevation, behind plow 28.

Upstanding frame structure 33-34 fixedly positions an elevated platform 35 on frame 17. Platform 35 includes spaced forwardly projecting means 36 for mounting a guide tube or one or more guide rolls 37 for cable 16, and the rear end of platform 35 is aligned for substantially tangential cable discharge to the upper guide bend 30. Suitable overhead mounting structure 38, above the operator's location of access to his controls 39, carries opposed pairs of guide rolls 40 for cable 16 passing to guide roll 37.

In accordance with a feature of the invention, a supply roll 45 of flexible sheet material 46 is suitably mounted at 47 to the frame 17 in position to continuously supply sheet 46 to the forward ramp 48 of an initially flat horizontal sheet-supportive portion 49 of platform 35; sheet material 46 may be medium-thickness cardboard or plastic strip. In the course of coordinated displacement of sheet 46 beneath cable 16, sheet 46 is subjected to progressive upwardly concave forming around the cable to the point within bend 30 where fresh cement, asphalt, grout or the like hardenable material can be funneled at 50 to fill an envelope of sheet 46, concentrically with respect to cable 16. The progressive steps in achieving this result are illustratively displayed in FIGS. 2 to 6, and will be discussed successively in that connection.

Figure 2:
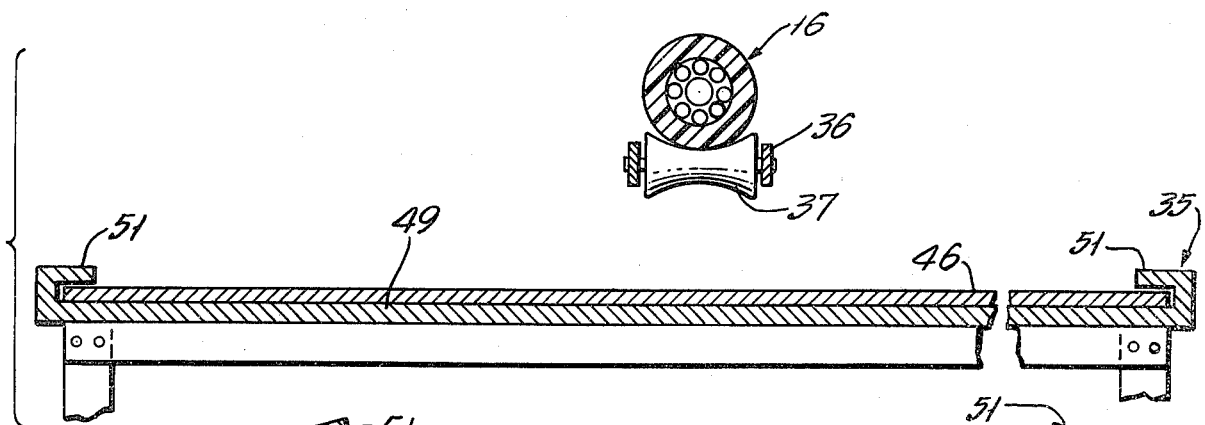
Figure 3:
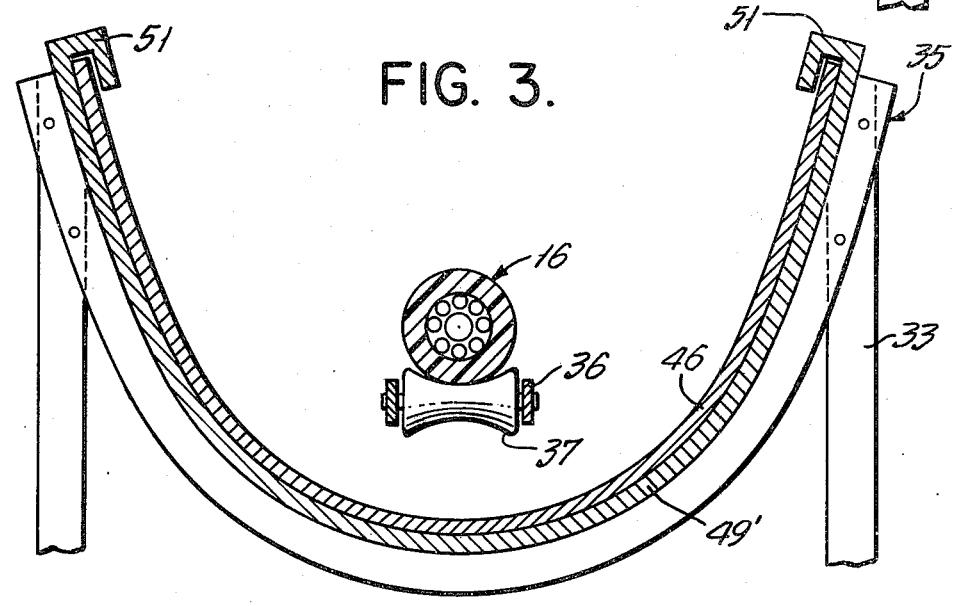

In FIG. 2, the moving sheet 46 and cable 16 are seen at the time when first brought into coordinated proximity, cable 16 being spaced above the transverse midpoint of sheet 46, and sheet 46 being guided between side flanges 51 of the flat entrance 49 of platform 35. The flat 49 and its side flanges 51 define a guide chute in the nature of a forming die of progressively changing section, it being noted that at location 3—3 of FIG. 1, it has achieved an upwardly dished concave contour, wherein the side flanges 51 have forced sheet 46 to conform to the now-arcuate curvature of the support surface, denoted 49' in FIG. 3. Cable 16 could be guided through an alignment tube as it moves in spaced relation to platform 35, but in the form shown one or more suitably spaced and supported (or suspended) rolls 37 will be understood to provide cable guidance to the point where other means can be relied upon.

One such alternative cable-guidance means is shown in FIG. 4 for the 4—4 location in FIG. 1. At this point, the sheet-supporting surface is approaching envelopment of cable 16 and is denoted 49''; it is still part of the platform 35, but for simplicity, structural underpinnings have been omitted. At the location depicted in FIG. 4, cable 16 is receiving support from radial tabs 52 struck or bent up from sheet material. Such tabs may be precut in sufficiently stiff (e.g., cardboard) sheet material 46, in readiness for radially inward deflection by suitably timed actuator means 53 (FIG. 1), the inward deflection of tabs 52 being retained by their downwardly loaded cablesupporting engagement. It will be understood that each actuator means 53 may be part of a pneumatic or cam-actuated punch and die set to form tabs to an orientation normal to the path of cable movement; alternatively, actuator 53 may be a solenoid-operated plunger, automatically timed for example by photoelectric detection of each successive precut tab formation.

As an alternative to use of sheath material 46 for support of cable 16, FIG. 4A illustrates use of a nonmetallic spacer 54 in the nature of a thin snap ring, insertable from above and into cable engagement, for example, automatically snap-engaged to cable 16 as it emerges from support by a last roll 37 or from a cable-guide tube, as mentioned above.

Figure 5:
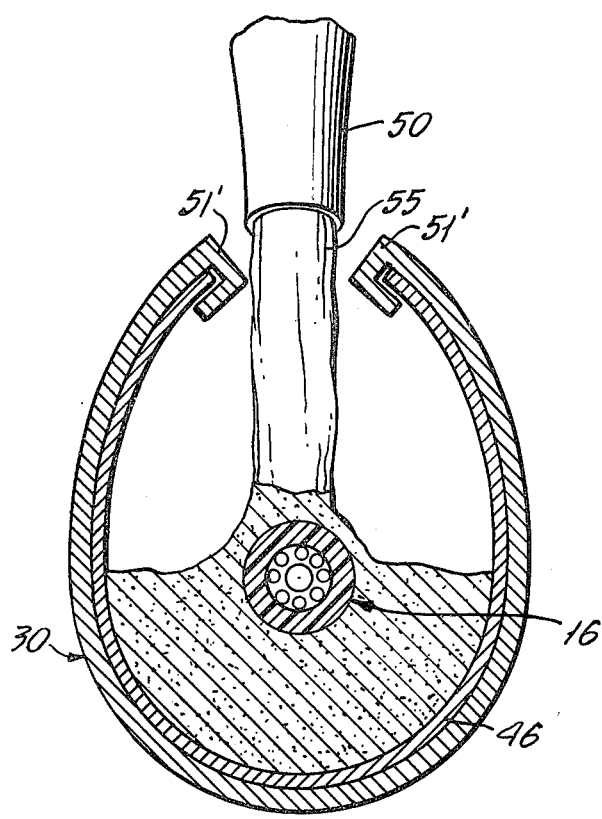
Figure 6:
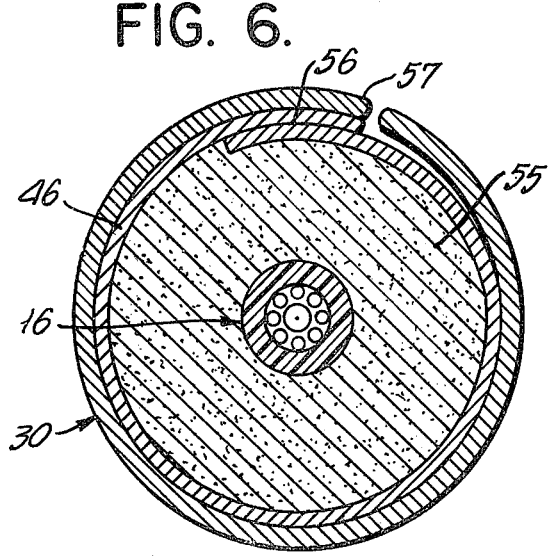

Having thus independently supported cable 16 within the enveloping sheath of sheet material 46, cable 16 and its incompletely closed sheath enter upon the guide bend 30 of the vertical frame 25 of plow 28. And FIG. 5 shows the cement-injecting event, within bend 30. Injection of viscous freshly mixed hardenable material 55 is gravitationally downward through the opening between lateral edges of sheet material 46. The viscosity of the cement should be adjusted to assure a uniform flow into all areas and yet not be so wet as to cause handling difficulty (e.g. spillage or overflow) downstream of the injection location. As indicated in FIG. 6, for the location 6—6 of FIG. 1, the progressive forming-die confinement of the guide bend 30 reduces the sectional area of sheet-material envelopment of cable 16 to the point of overlapping the once-lateral sides thereof, as depicted at overlap 56 in FIG. 6. It will be noted that by this stage of sheath formation, the side flanges 51' (FIG. 5) have terminated, and a rigid part 57 of one side of guide bend 30 overlaps and thus positively retains the lapped-sheet region 56. The filled and sheathed volume surrounding cable 16 is now complete in terms of ultimate size and concentric relation to cable 16, and in the process of sectional-area reduction from the FIG. 5 to the FIG. 6 situation, the cement will have been compressed void-free into all areas inside the now-tubular sheath 46 and around cable 16, and openings attributable to tabs 52 will have permitted a degree of release of any excess cement.

Figure 7:
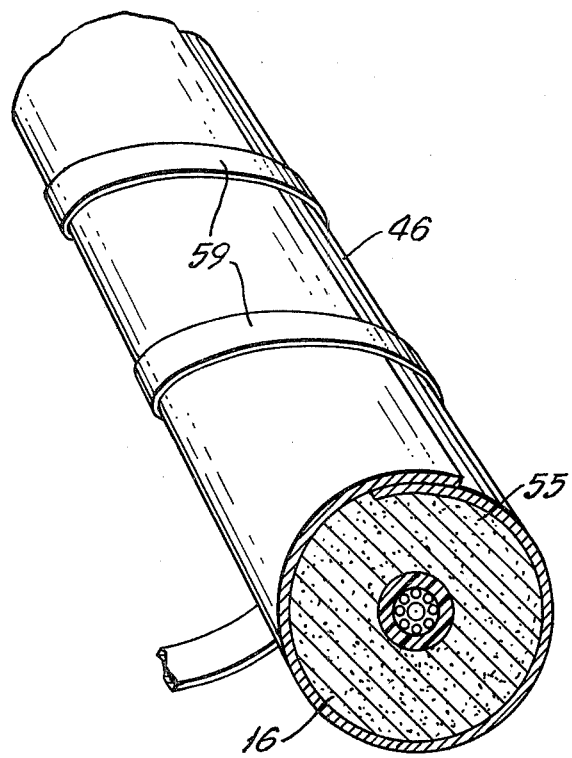
Figure 8:
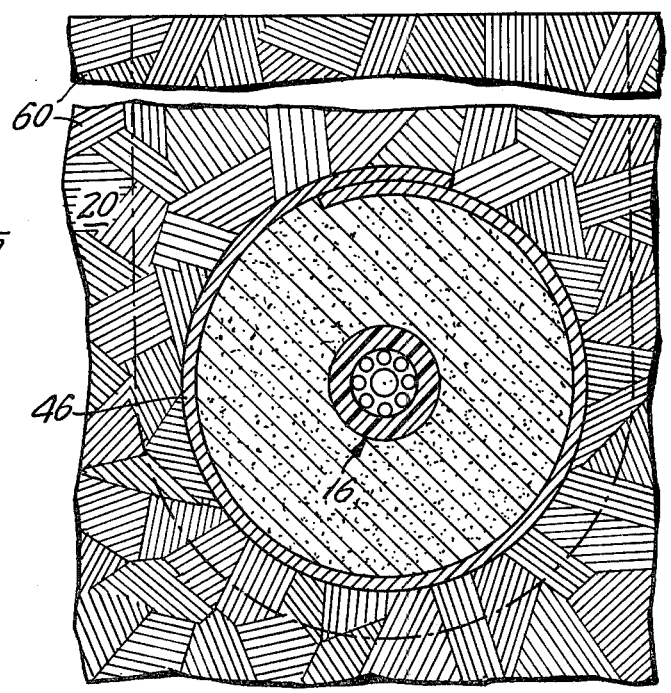

FIG. 7 illustrates that in the vertical portion 31 of the guide means of frame 25, a local cut-out region thereof accommodates tape or other binder-wrapping mechanism 58 (FIG. 1) for applying a helical retaining wrap 59 of the sheathed product issuing from the FIG. 6 location. Such a wrap will be understood as a temporary mechanical aid to hold tube diameter as it is being guided and is then placed into the ground. This helical wrap ensures filled sectional fidelity of the product as it is guided through the lower bend 32, to and after the point of discharge from the tail-end of plow 28. Once released from the plow, the product rests in the plowed earth, which immediately surrounds the buried product, i.e., before the cement filling has set. FIG. 8 depicts the ultimate buried position of the product, in the context of the blade profile 60, shown in phantom outline.

It will be seen that a method and apparatus have been described that meet all stated objects, achieving important economies with respect to any technique involving factory provision against rodent attack. The technique is also particularly applicable to affording such protection with wholly non-electrically conductive means, an important consideration for fiber-optic communication cable. Such cement-encased cable as is thus buried becomes an anchor reference, with respect to which ongoing vehicle motion serves to pull freshly encased cable through and from the guide means of vertical frame 25; at the same time the same pull draws cable 16 from its drum in matching relation to the supply of sheet material 46. But by having confined the cement in its sheathed and concentric envelopment of the cable, the incremental tension forces applied to the cable are minimal and can be gracefully contained within the compressed but unset cement. Gravitationalfeed force within the guide means 30-31-32 is also an important factor in reducing or offsetting what might otherwise be strong tension on the cable per se.

As an option, even for optical fiber cable which should not be conductively sheathed, the method and apparatus of the invention lend themselves to automatic memory of a location which may be the desired site of future work, as for junction, splicing or the like, or for merely tracking the course of a long-buried cable. Such memory is achieved by use of "marker" inserts at desired locations and intervals, the inserts being electrically conductive or paramagnetic, but in electrical isolation with respect to each other. For example, every one in ten spacers 54 (FIG. 4A) may be conductive and thus susceptible of later location by suitable detector means.

While the invention has been described in detail for a preferred form, it will be understood that modifications may be made without departure from the scope of the invention.

What is claimed is:

1. The method of laying rodent-protected cable from a forwardly moving vehicle having (1) a cable supply-reel support from which unprotected cable can be continuously paid out and (2) a sheath-material reel support from which a strip of flexible sheath material can be continuously paid out, the strip being of width between lateral edges more than sufficient to circumferentially envelop the cable at desired ultimate radial offset from the cable, which method comprises continuously paying out from said supports a supply of cable and a supply of sheath material at a rate coordinated with forward movement of the vehicle, supporting the sheath material at substantially said offset beneath the cable and for a predetermined longitudinal zone of travel of cable and sheath material, the sheath entering said zone in substantially flat condition and being formed into upwardly dished enveloping contour around the cable as it travels through said zone, centrally supporting the cable with respect to the progressively enveloping sheath, completing the sheath-envelopment of the cable by lapping the edges of the sheath, admitting a continuous flow of hardenable cementitious material between lateral edges of the sheath to fill the sectional area defined by the sheath just prior to sheath-edge lapping to complete the envelopment, and guiding the thus-filled and ensheathed cable to ground-supported at-rest position behind the vehicle while the vehicle is moving forward, whereby the cementitious material may harden in situ to become a rodent-protective sheath.

2. The method of claim 1, in which said guidance step is with the lapped lateral edges uppermost.

3. The method of claim 1, in which said guidance step a helical wrap of flexible material is applied to retain the lap of said edges at least until hardening of the cementitious material.

4. The method of claim 1, in which said longitudinal zone of travel includes a downstream end region which is downwardly inclined at least where the sheath edges are lapped, the cementitious filling being admitted in the inclined region.

5. The method of claim 1, in which cable displacement is generally along a zig-zag course involving initial displacement along an above-ground horizontal course leg and terminal displacement along a discharge course leg at or below ground level, with a steep downward leg having smoothly faired connection to and between said horizontal legs, said predetermined longitudinal zone lapping portions of both said above-ground leg and said downward leg.

6. The method of claim 1, in which said central-supporting step is performed by locally deforming spaced regions of sheath material into radially inwardly extending cable-positioning engagement.

7. The method of claim 1, in which said central-supporting step is performed by inserting radial-spacer elements at longitudinal intervals within the enveloping sheath, said spacer elements engaging both the sheath material and the cable.

8. In a cable-laying vehicle having means at its forward end to support a cable reel and a boom with a paid-cable guide at its rearward end, wherein said guide comprises a zig-zag with an upper generally horizontal inlet end and a lower generally horizontal discharge end joined by a generally vertical region having smoothly curved tangential connection to both said ends, the improvement wherein said vehicle further includes means for reel support and payout of flexible sheath material between the cable-reel support and said inlet end and beneath said inlet end, forming means generally horizontally guiding paid-out sheet material beneath said cable at a predetermined offset below said cable and for a predetermined longitudinal distance at least to said inlet end, said forming means being adapted to dish said sheath material in progressively enveloping relation with the cable as said longitudinal cable and sheath material is displaced means for continuously filling the enveloping sheath with a flow of hardenable cementitious material, and the guide through said generally vertical region and said discharge end being configured to support and generally cylindrically confine the filled envelope of said sheath to the point of rearward discharge from the vehicle.

9. The improvement of claim 8, in which said boom has articulated connection to the frame of said vehicle, said forming means and said filling means being carried by said boom.

10. The improvement of claim 8, in which said forming means includes intermittently operable means for punching and locally inwardly displacing cable-engaging radial lugs of sheath material at a location upstream from the location of said filling means.

11. The method of claim 1, in which the sheath material is of medium-thickness cardboard.

12. The method of claim 11, in which the cardboard is water-absorbent and the hardenable material is a mixture with water.

13. The method of claim 1, in which the sheath material is plastic sheeting.

14. The method of claim 1, in which the sheath material is of kraft paper with an external play of open-mesh non-metallic filament adhered thereto.

15. The method of claim 1, in which the sheath material is a composite laminate of at least two different sheet materials.

16. The method of claim 15, in which at least one of the sheath materials is synthetic and at least another of the sheath materials is a natural-fiber product.

* * * * *